US008516686B2

(12) United States Patent
Nojima (10) Patent No.: US 8,516,686 B2
(45) Date of Patent: Aug. 27, 2013

(54) METHOD FOR INSPECTING A SLIDER FOR A DISK DRIVE

(75) Inventor: Akira Nojima, Atsugi (JP)

(73) Assignee: NHK Spring Co., Ltd., Yokohama-Shi (JP)

( * ) Notice: Subject to any disclaimer, the term of this patent is extended or adjusted under 35 U.S.C. 154(b) by 0 days.

(21) Appl. No.: 13/526,266

(22) Filed: Jun. 18, 2012

(65) Prior Publication Data

US 2012/0257306 A1 Oct. 11, 2012

Related U.S. Application Data

(62) Division of application No. 12/419,456, filed on Apr. 7, 2009, now Pat. No. 8,220,139.

(30) Foreign Application Priority Data

Apr. 28, 2008 (JP) ................ 2008-117774

(51) Int. Cl.
*G11B 5/127* (2006.01)
*H04R 31/00* (2006.01)
(52) U.S. Cl.
USPC ............... 29/603.1; 29/603.03; 29/603.04; 29/603.07; 29/737; 324/210; 324/750.25; 360/31
(58) Field of Classification Search
USPC ........... 29/603.03, 603.04, 603.07, 603.09, 29/603.1, 603.12, 727, 737; 324/210, 750.25; 360/31
See application file for complete search history.

(56) References Cited

U.S. PATENT DOCUMENTS

| | | | |
|---|---|---|---|
| 5,219,651 A * | 6/1993 | Shoji et al. | 428/323 |
| 5,844,420 A | 12/1998 | Weber et al. | |
| 6,459,260 B1 * | 10/2002 | Bonin et al. | 324/750.25 |
| 6,771,453 B2 | 8/2004 | Baumgartner et al. | |
| 6,943,971 B2 | 9/2005 | Kainuma et al. | |
| 7,124,625 B1 | 10/2006 | Kurita et al. | |
| 7,368,905 B2 * | 5/2008 | Grinberg et al. | 324/210 |
| 7,471,081 B2 * | 12/2008 | Kainuma et al. | 324/210 |
| 7,719,796 B2 | 5/2010 | Takahashi et al. | |
| 7,889,460 B2 | 2/2011 | Hanya et al. | |

FOREIGN PATENT DOCUMENTS

| | | |
|---|---|---|
| JP | 2-027512 A | 1/1990 |
| JP | 2004-086976 A | 3/2004 |
| JP | 2005-322377 A | 11/2005 |
| JP | 2006-344324 A | 12/2006 |
| JP | 2007-012168 A | 1/2007 |
| JP | 2007-305209 A | 11/2007 |

OTHER PUBLICATIONS

Japanese Office Action dated Aug. 7, 2012 (and English translation thereof) in counterpart Japanese Application No. 2008-117774.

* cited by examiner

*Primary Examiner* — Paul D Kim
(74) *Attorney, Agent, or Firm* — Holtz, Holtz, Goodman & Chick, P.C.

(57) ABSTRACT

A slider tester includes a disk, movable table, table drive mechanism, guide member, etc. A plurality of suspensions are mounted on the movable table. A slider is mounted on each suspension. A guide member can support respective lift tabs of the suspensions. The guide member includes a first guide surface, second guide surface, and opening arranged in a track width direction of the disk. When any of the lift tabs gets into the opening as the movable table moves in the track width direction of the disk, the slider is dropped toward a recording surface of the disk.

5 Claims, 6 Drawing Sheets

METHOD FOR INSPECTING A SLIDER FOR A DISK DRIVE

CROSS-REFERENCE TO RELATED APPLICATIONS

This application is a Divisional Application of U.S. application Ser. No. 12/419,456, filed Apr. 7, 2009, now U.S. Pat. No. 8,220,139, which is based upon and claims the benefit of priority from prior Japanese Patent Application No. 2008-117774, filed Apr. 28, 2008, the entire contents of both of which are incorporated herein by reference.

BACKGROUND OF THE INVENTION

1. Field of the Invention

This invention relates to a slider tester for inspecting a slider of a disk drive used in an information processing apparatus or the like.

2. Description of the Related Art

A hard disk drive (HDD) includes a disk that functions as a recording medium, disk drive suspension (hereinafter simply referred to as the suspension), actuator arm on which the suspension is mounted, etc. Data is magnetically recorded on the disk. A slider is mounted on the distal end portion of the suspension. This slider is provided with a magnetoelectric element used to access data to a recording surface of the disk, that is, an element for writing or reading data.

The suspension includes a base plate fixed to the actuator arm, load beam attached to the base plate, flexure located along the load beam, etc. The slider is mounted on a tongue (gimbal portion) formed on the flexure. When the disk is rotated at high speed by a spindle motor, the slider is caused to fly slightly above the surface of the disk by air that flows between the disk and slider, thereby forming an air bearing between the disk and slider. The flying height of the slider is kept within an appropriate range.

Before the suspension is incorporated into an actual disk drive, the slider is checked for acceptability by means of a slider tester. An example of a conventional slider tester is disclosed in Jpn. Pat. Appln. KOKAI Publication No. 2004-86976 (Patent Document 1). In this slider tester, a slider is fixed to an arm portion so as to share the same conditions with an actual suspension. A magnetic disk is rotated so that the slider flies, and the properties of the slider are measured.

On the other hand, a slider tester (slider supporting device) disclosed in Jpn. Pat. Appln. KOKAI Publication No. 2005-322377 (Patent Document 2) includes dummy load beams, flexures, etc., constructed in the same manner as those of actual suspensions. This slider tester is configured so that a slider can be removably attached thereto. In the slider tester, a disk is rotated with the slider mounted on a suspension, and various inspections are conducted with the slider flying above the surface of the disk. Any slider judged to be unacceptable by these inspections is rejected.

Only one slider can be mounted in each of the slider testers described in Patent Documents 1 and 2. The properties of the slider are measured by accessing the recording surface of the disk with a magnetoelectric element of the slider after the slider is moved to a predetermined position above the disk. After the measurement, the slider is moved to its original position and removed from the tester. Conventionally, therefore, each slider is singly mounted in the tester as it is tested. Thus, testing a plurality of sliders is not efficient and requires a long time.

In order to improve the efficiency of the slider inspection operation, an attempt was made to provide a common table with a plurality of suspensions for a tester each mounted with a slider. A plurality of sliders simultaneously move to a region above the recording surface of the disk as the table is moved radially relative to the disk (or along the track width). However, the peripheral rotational speed of the disk varies considerably between the inner and outer peripheral sides. The flying height of the slider depends on the peripheral rotational speed of the disk. Thus, the flying height of the slider that is moved to, for example, the inner peripheral portion of the disk tends to become smaller than when the slider is at the outer peripheral portion.

It conducting a read/write test for the slider using the radial central part of the disk, the flying height is adjusted to an appropriate value based on the radial intermediate part. If the slider moves to the inner peripheral side of the disk, therefore, its flying height becomes smaller than the appropriate value. In consequence, the slider may interfere with the recording surface of the disk.

BRIEF SUMMARY OF THE INVENTION

The present invention provides a slider tester capable of safely and efficiently testing a plurality of sliders used in a disk drive.

The invention is a slider tester for inspecting a slider for a disk drive, which comprises: a disk for use as a recording medium; a rotational mechanism which rotates the disk; a suspension including a lift tab on the distal end thereof and a gimbal portion on which the slider is mounted; a movable table movable in a track width direction of the disk; a table drive mechanism which moves the movable table in the track width direction; a signal processing section which is electrically connected to an element of the slider and processes a signal to access a recording surface of the disk; and a guide member which is located between the lift tab and the recording surface of the disk and supports the lift tab, thereby preventing the slider from falling onto the disk. The movable table includes a suspension support portion which holds a plurality of the suspensions arranged in the track width direction of the disk. The guide member includes a guide surface extending in the track width direction of the disk and in contact with the lift tab and an opening which is formed in the middle with respect to the track width direction of the guide surface and allows the lift tab to move toward the recording surface of the disk.

In this slider tester, the movable table is moved along the track width of the disk so that the respective lift tabs of the suspensions, each having the slider thereon, are situated one after another in the opening of the guide member, and the sliders are successively dropped toward the recording surface of the disk. By doing this, the sliders can be inspected in succession and tested efficiency. According to the slider tester of the invention, only the slider being inspected, out of the sliders mounted on the movable table, can be opposed to the recording surface of the disk. The other sliders can be kept on standby in positions distant from the recording surface of the disk with the lift tabs supported by the guide member.

In a preferred aspect of the invention, the guide member includes a first guide surface, which is inclined so that a distance from the recording surface of the disk gradually decreases from the outer peripheral side of the disk toward the opening, and a second guide surface, which is inclined so that a distance from the recording surface of the disk gradually increases from the opening toward the inner peripheral side of the disk.

Further, the suspension may be provided with a clamp mechanism which removably holds the slider, the clamp mechanism including a first support portion which supports one end portion of the slider, a second support portion which supports the other end portion of the slider, and a spring portion which urges the second support portion toward the first support portion with the slider interposed between the first and second support portions.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL
VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An embodiment of the present invention will now be described with reference to FIGS. 1 to 9.

Figure 1:
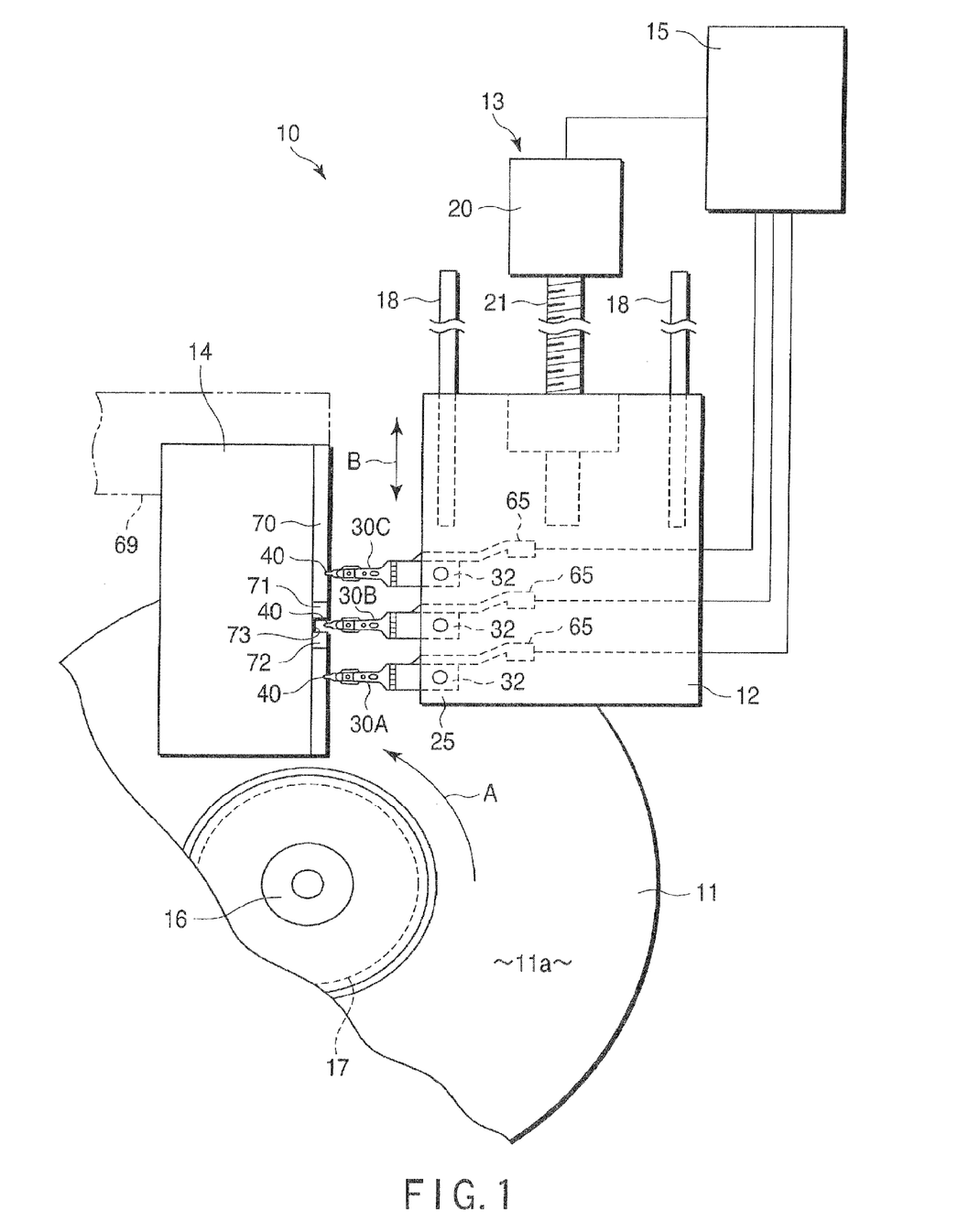
FIG. 1 is a partial plan view of a slider tester according to an embodiment of the invention.

A slider tester 10 shown in FIG. 1 includes a disk 11 that functions as a recording medium, movable table 12, table drive mechanism 13, guide member 14, signal processing section 15, etc. The disk 11 has a recording surface 11a on which data can be magnetically recorded. The disk 11 is rotated in a fixed direction (indicated by arrow A in FIG. 1) by a rotational mechanism 17 with a spindle 16.

The movable table 12 can reciprocate transversely along guide members 18 relative to the track of the recording surface 11a of the disk 11 (or in the direction indicated by arrow B in FIG. 1). An example of the table drive mechanism 13 includes a servomotor 20 and ball screw 21. As the servomotor 20 rotates, the movable table 12 can move for a desired distance along the track width. The signal processing section 15 that functions as a controller can control the table drive mechanism 13 by using an information processing apparatus, such as a personal computer.

The movable table 12 is provided with a suspension support portion 25. Suspensions 30A to 30C for the slider tester 10 are located on the support portion 25. These suspensions are arranged transversely relative to the track of the disk 11 (or in the direction indicated by arrow B in FIG. 1) in parallel relation. The suspensions 30A to 30C have the same configuration.

Figure 2:
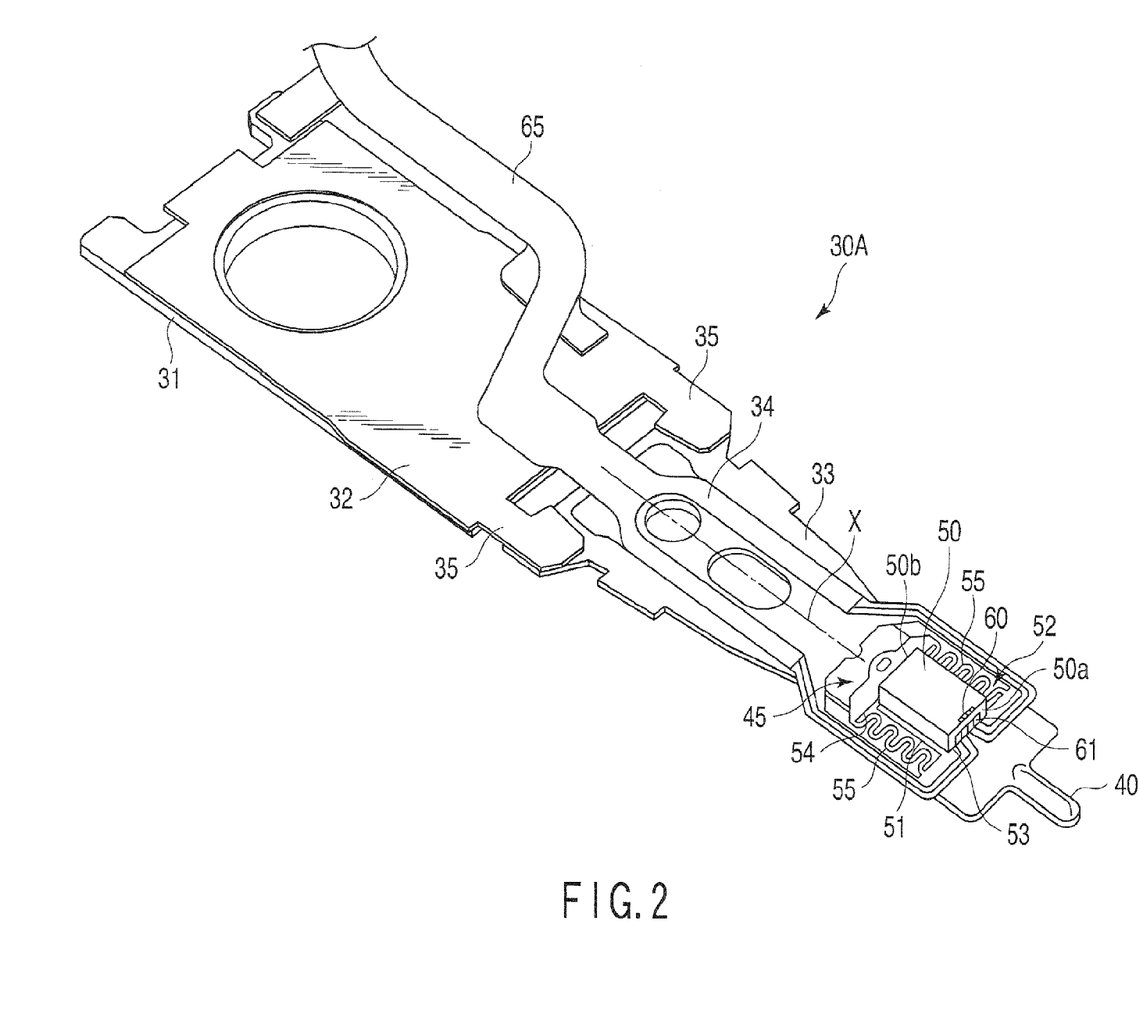
FIG. 2 is a perspective view of a suspension used in the slider tester shown in FIG. 1.

FIG. 2 shows an example of the suspension 30A for the slider tester. The suspension 30A is constructed in substantially the same manner a suspension that is incorporated in an actual hard disk drive. Specifically, the suspension 30A is provided with a base portion 32 including a base plate 31, load beam 33 attached to the base plate 31, and flexure 34 located along the load beam 33. Springy hinge portions 35 are disposed between the base portion 32 and load beam 33. The hinge portions 35 can bend along the thickness of the load beam 33.

A load/unload tab, that is, a lift tab 40 formed of a projection, is disposed on the distal end of the load beam 33. The lift tab 40 extends along an axis X of the load beam 33. The tab 40 protrudes forward from the distal end of the load beam 33.

A gimbal portion 45 is provided near the distal end portion of the flexure 34. The gimbal portion 45 includes a tongue 51 on which a slider 50 is mounted and a clamp mechanism 52 for fixing the slider 50. The clamp mechanism 52 is composed of a first support portion 53, second support portion 54, a pair of spring portions 55, etc. The first support portion 53 is in contact with one end portion 50a of the slider 50. The second support portion 54 is in contact with the other end portion 50b of the slider 50. The pair of spring portions 55 connect the support portions 53 and 54 to each other. The slider 50 is interposed between the first and second support portions 53 and 54. In this state, the second support portion 54 is urged toward the first support portion 53 by the spring portions 55.

The spring portions 55 are formed individually on the opposite sides of the gimbal portion 45 by etching a part of the flexure 34 that is formed of a metal plate. An example of each spring portion 55 is a flat spring having U-shaped convexes and inverted-U-shaped concaves. These convexes and concaves are alternately formed along the axis of the flexure 34, that is, along the axis X of the load beam 33.

Read/write elements, that is, magnetoelectric elements 60 are disposed on the end portion 50a of the slider 50 that constitutes a magnetic head. The elements 60 are transducers such as magnetoelectric devices, which are used to access data to the recording surface 11a of the disk 11. The elements 60 electrically conduct to a terminal area 61 of the slider 50.

The flexure 34 is provided with a circuit member 65. When the slider 50 is clamped by the clamp mechanism 52, the terminal area 61 of the slider 50 electrically conducts to the circuit member 65. The circuit member 65 is connected to the signal processing section 15 (shown in FIG. 1). The signal processing section 15 accesses (writes or reads) data to or from the recording surface 11a of the disk 11 through the elements 60.

The guide member 14 is mounted on a frame 69 (partially shown in FIG. 1) of the slider tester 10 and can stand still with respect to the disk 11. The guide member 14 is formed of a self-lubricating synthetic resin, such as polyacetal, and is located between the recording surface 11a of the disk 11 and the lift tabs 40.

The guide member 14 has a guide surface 70 that supports the lift tab 40. The guide surface 70 extends transversely relative to the track of the disk 11 (or in the direction indicated by arrow B in FIG. 1). Further, the guide member 14 has a first guide surface 71, second guide surface 72, and opening 73, which are arranged transversely relative to the track of the recording surface 11a. The opening 73 is formed between the first and second guide surfaces 71 and 72. The opening 73 is sufficiently large to allow the passage of each lift tab 40 along the thickness of the guide member 14 toward the recording surface 11a of the disk 11.

Figure 6:
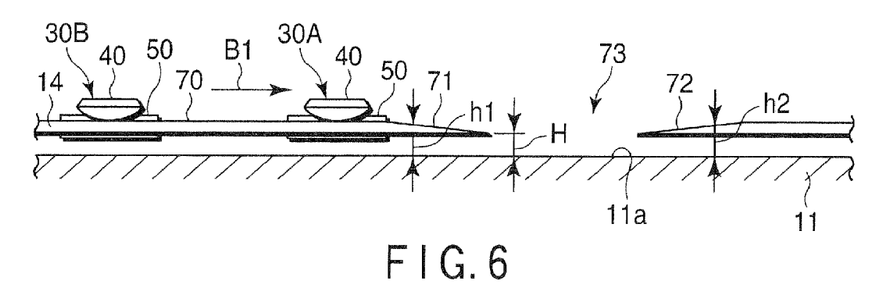
FIG. 6 is a front view showing a state in which the lift tab of the first suspension is moving toward the opening of the guide member.

As shown in FIG. 6, the guide member 14 is located at a certain distance H from the recording surface 11a of the disk 11. The first guide surface 71 is inclined so that a distance h1 from the recording surface 11a of the disk 11 gradually decreases from the outer peripheral side of the disk 11 toward the opening 73. The second guide surface 72 is inclined so that a distance h2 from the recording surface 11a of the disk 11 gradually increases from the opening 73 toward the inner peripheral side of the disk 11.

The distance from the recording surface 11a of the disk 11 to each lift tab 40 is equivalent to the height of the tab 40. The height of the lift tab 40 is such a height that the tab 40 in the opening 73 can get on the first or second guide surface 71 or 72 when it moves transversely relative to the track.

The following is a description of the operation of the slider tester 10 according to the present embodiment.

Figure 3:
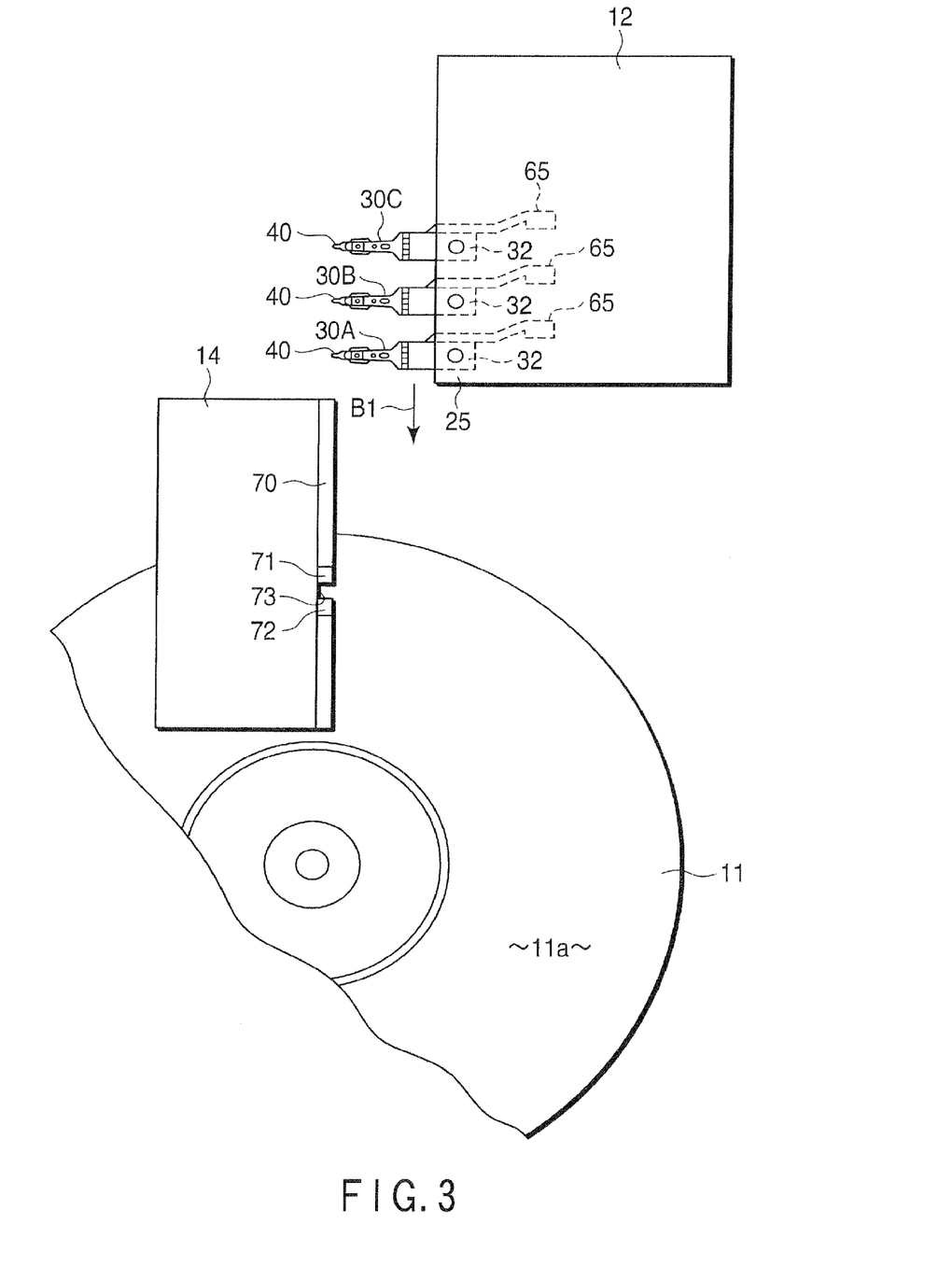
FIG. 3 is a plan view showing a movable table of the slider tester in a standby position.

FIG. 3 shows the movable table 12 moved to a standby position. In this standby position, the table 12 is kept radially apart from the outer peripheral portion of the disk 11. The respective base portions 32 of the suspensions 30A to 30C are fixed to the suspension support portion 25 of the movable table 12.

The slider 50 is held on the gimbal portion 45 of each of these suspensions by the clamp mechanism 52.

As the movable table 12 moves in the direction indicated by arrow B1 from the standby position shown in FIG. 3, the suspensions 30A to 30C individually move transversely relative to the track toward the inner peripheral portion of the disk 11. As partially shown in FIG. 6, the respective lift tabs 40 of the suspensions 30A to 30C move transversely relative to the track (or in the direction indicated by arrow B1) as they slide on the guide surface 70 of the guide member 14.

Figure 4:
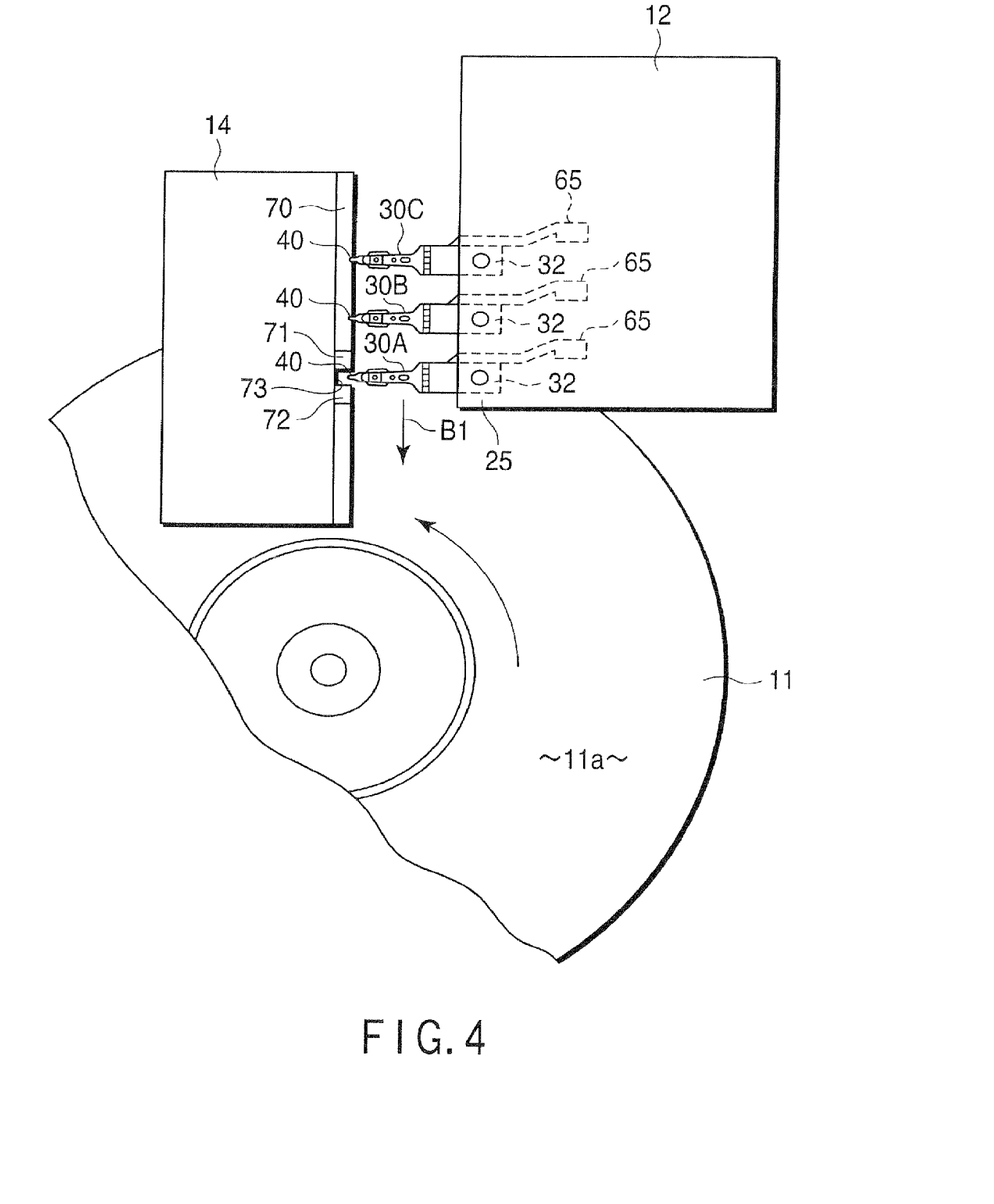
FIG. 4 is a plan view showing a state in which a lift tab of a first suspension mounted on the movable table is situated in an opening of a guide member.
Figure 7:
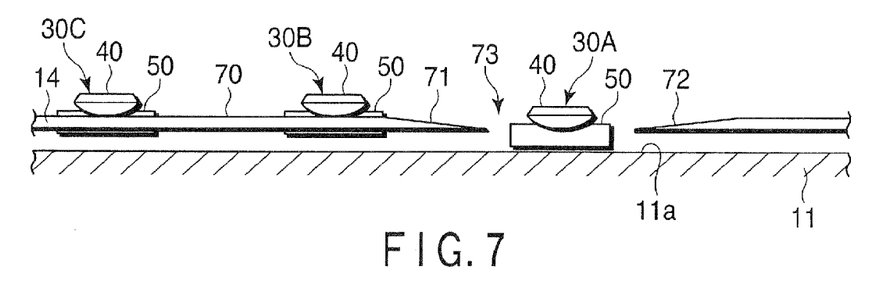
FIG. 7 is a front view showing a state in which the lift tab of the first suspension is in the opening of the guide member.

When the movable table 12 moves transversely relative to the track, as shown in FIGS. 4 and 7, the lift tab 40 of the suspension 30A in a leading position with respect to the movement reaches the opening 73, guided by the first guide surface 71. As the tab 40 gets into the opening 73, the slider 50 of the first suspension 30A is dropped toward the recording surface 11a of the disk 11.

Since the disk 11 rotates at high speed, air flows between the recording surface 11a and slider 50 above it, thereby forming an air bearing between the slider and recording surface. Thus, the slider 50 flies at an appropriate flying height above the recording surface 11a of the disk 11.

When the slider 50 is thus situated above the recording surface 11a, the movable table 12 is temporarily stopped as required, and data is accessed to or from the recording surface 11a of the disk 11 through the elements 60. The data is written to the recording surface 11a of the disk 11 through the elements 60, based on, for example, a write current output from the signal processing section 15. Alternatively, data recorded on the recording surface 11a is read by means of the elements 60 and output to the signal processing section 15. The slider 50 is inspected based on these data.

Figure 8:
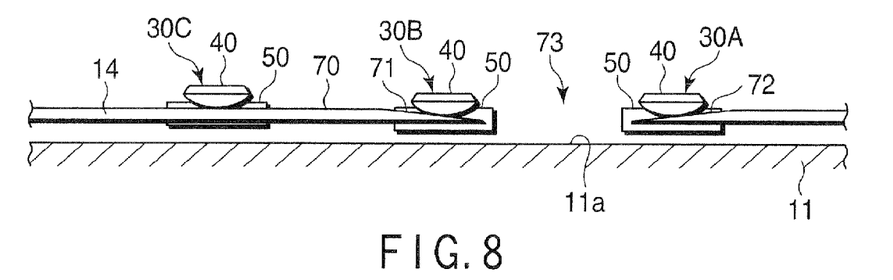
FIG. 8 is a front view showing a state in which the lift tab of the first suspension is on a second guide surface.

After the slider 50 of the first suspension 30A is inspected, the movable table 12 is further moved transversely relative to the track (or in the direction indicated by arrow B1 in FIG. 4). Thereupon, the lift tab 40 of the suspension 30A gets on the second guide surface 72, as shown in FIG. 8, and then moves toward the inner peripheral portion of the disk 11. Thus, the slider 50 is kept apart from the recording surface 11a of the disk 11 and held by the guide member 14.

Figure 9:
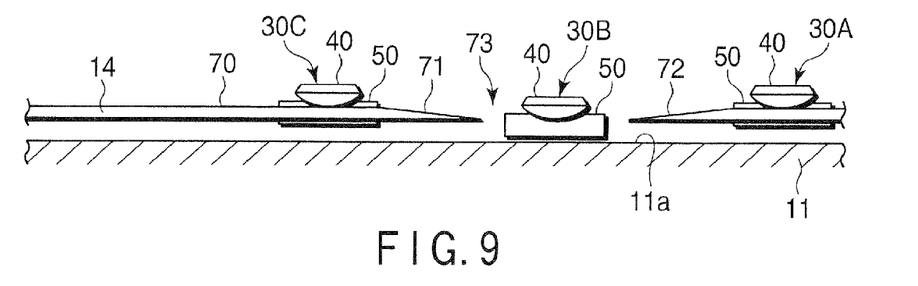
FIG. 9 is a front view showing a state in which a lift tab of a second suspension is in the opening of the guide member.

As shown in FIGS. 1 and 9, the lift tab 40 of the second suspension 30B reaches the opening 73. As the tab 40 of the second suspension 30B gets into the opening 73, the slider 50 is dropped toward the recording surface 11a of the disk 11. After the second slider 50 is tested, the movable table 12 is further moved transversely relative to the track.

Figure 5:
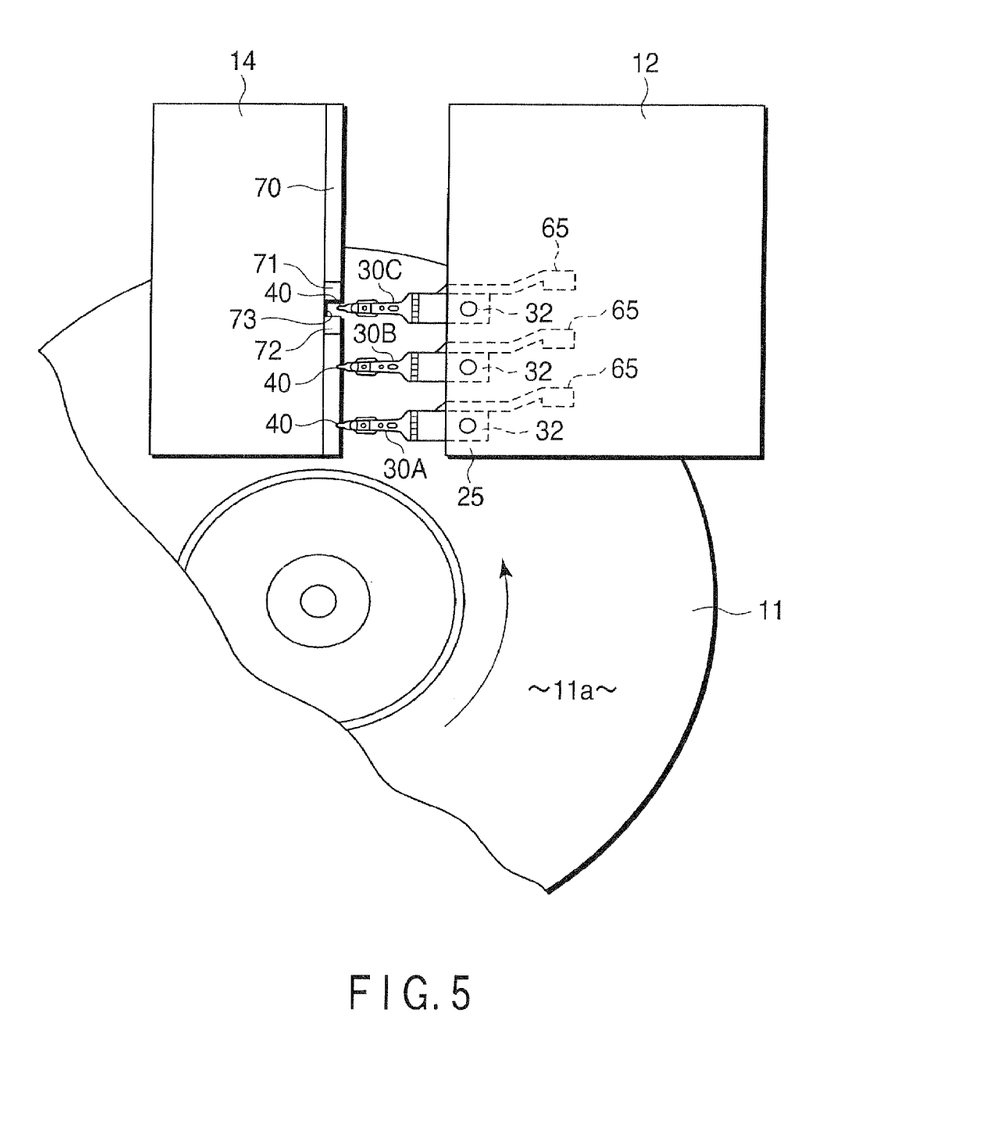
FIG. 5 is a plan view showing a state in which a lift tab of a third suspension mounted on the movable table is situated in the opening of the guide member.

As shown in FIG. 5, the lift tab 40 of the third suspension 30C reaches the opening 73. As the tab 40 of the third suspension 30C gets into the opening 73, the slider 50 is dropped toward the recording surface 11a of the disk 11.

After the inspections of the respective sliders 50 of the suspensions 30A to 30C are finished, the movable table 12 is returned to a standby position shown in FIG. 1. In this standby position, the distance between the support portions 53 and 54 of each clamp mechanism 52 is increased by using a removal jig (not shown). By doing this, each slider 50 is removed from the gimbal portion 45. Any of the sliders 50 judged to be acceptable by the inspection is attached to its corresponding suspension incorporated in the actual disk drive. Any slider judged to be unacceptable by the inspection is rejected.

As described above, the plurality of sliders 50 can be successively inspected as the movable table 12 on which the suspensions 30A to 30C are mounted is moved transversely relative to the track of the recording surface 11a. Thus, the sliders 50 can be efficiently inspected in a short time In the slider tester 10 of the present embodiment, the slider 50 of that suspension which, among the suspensions 30A to 30C held on the movable table 12, has its lift tab 40 in the opening 73 is opposed to the recording surface 11a of the disk 11 and inspected. The sliders 50 not being inspected are left on standby in positions apart from the disk 11 without being dropped onto the disk.

Without the guide member 14, the flying height of the slider 50 moved close to the inner peripheral portion of the disk 11 may be smaller than an appropriate value, owing to variations in workmanship between the suspensions, restrictions on the accuracy of the movable table 12, etc. If the flying height is smaller than the appropriate value, the slider 50 may contact the disk 11.

According to the present embodiment, however, only the slider 50 being inspected can be made to fly at the appropriate flying height above the recording surface 11a of the disk 11. The other sliders 50 can be kept on standby in positions sufficiently distant from the recording surface 11a of the disk 11 by the guide member 14. For example, therefore, the slider 50 that is on standby in a position near the inner peripheral portion of the disk 11 can be prevented from contacting the recording surface 11a of the disk 11, so that the inspection can be conducted safely.

In the embodiment described herein, the dummy suspensions 30A to 30C dedicated for the tester are mounted on the suspension support portion 25 of the movable table 12. For another embodiment, however, a plurality of head-gimbal assemblies (HGAs) incorporated in the actual hard disk drive may be mounted on the suspension support portion 25 of the movable table 12. Since each HGA includes a suspension and slider, the respective sliders of the HGAs can be efficiently inspected by using the slider tester 10. The number of suspensions mounted on the suspension support portion 25 of the movable table 12 may also be any number other than three.

It is to be understood, in carrying out the invention, that the components of the slider tester, including the disk, movable table, table drive mechanism, guide member, and suspensions, may be modified variously without departing from the scope of the invention.

Additional advantages and modifications will readily occur to those skilled in the art. Therefore, the invention in its broader aspects is not limited to the specific details and representative embodiments shown and described herein.

Accordingly, various modifications may be made without departing from the spirit or scope of the general inventive concept as defined by the appended claims and their equivalents.

What is claimed is:

1. A method for inspecting a slider for a disk drive, comprising:

locating a movable table, which is movable in a track width direction of a disk, in a standby position at a distance from the disk;

disposing a plurality of suspensions on a suspension support portion of the movable table;

mounting the slider on a gimbal portion of each said suspension;

rotating the disk;

moving the movable table toward an inside of the disk, thereby moving respective lift tabs of the suspensions in a track width direction of the disk along a guide member;

moving the lift tab of a first suspension situated on a front side with respect to a direction of the movement along a first guide surface to an opening of the guide member;

dropping the slider of the first suspension toward a recording surface of the disk through the opening, thereby causing the first slider to fly above the recording surface;

accessing the recording surface by means of an element of the slider in order to inspect the first slider;

further moving the movable table toward the inside of the disk, thereby causing the lift tab of the first suspension to get on a second guide surface of the guide member;

further moving the movable table toward the inside of the disk, thereby causing the lift tab of a second suspension to move along the first guide surface to the opening;

dropping the slider of the second suspension toward the recording surface through the opening, thereby causing the second slider to fly above the recording surface;

accessing the recording surface by means of the element of the slider in order to inspect the second slider;

moving the movable table toward the standby position after access is finished; and removing the sliders from the suspensions having moved to the standby position.

2. A method for inspecting a slider for a disk drive, comprising:

locating a movable table, which is movable in a track width direction of a disk, in a standby position at a distance from the disk;

disposing a suspension on a suspension support portion of the movable table;

mounting the slider on a gimbal portion of said suspension;

rotating the disk;

moving the movable table toward an inside of the disk, thereby moving a lift tab of the suspension in a track width direction of the disk along a guide member;

moving the lift tab of the suspension along a first guide surface to an opening of the guide member;

dropping the slider of the suspension toward a recording surface of the disk through the opening, thereby causing the slider to fly above the recording surface;

accessing the recording surface by means of an element of the slider in order to inspect the slider;

further moving the movable table toward the inside of the disk, thereby causing the lift tab of the suspension to get on a second guide surface of the guide member;

moving the movable table toward the standby position after access is finished; and removing the slider from the suspension having moved to the standby position.

3. The method for inspecting the slider according to claim 2, wherein the first guide surface inclines so that a distance from the recording surface of the disk gradually decreases from an outer peripheral side of the disk toward the opening, and the lift tab moves along the first guide surface toward the opening so that the distance from the recording surface gradually decreases from the outer peripheral side of the disk toward the opening.

4. The method for inspecting the slider according to claim 3, wherein the second guide surface inclines so that a distance from the recording surface of the disk gradually increases from the opening toward an inner peripheral side of the disk, and the lift tab moves along the second guide surface toward the inner peripheral side of the disk so that the distance from the recording surface gradually increases from the opening toward the inner peripheral side of the disk.

5. The method for inspecting the slider according to claim 2, wherein the slider is clamped between first and second support portions of the suspension by means of a spring.

* * * * *